(12) United States Patent
Toshima

(10) Patent No.: US 7,771,828 B2
(45) Date of Patent: Aug. 10, 2010

(54) BINDER COMPOSITION APPLIED FOR POLYESTER TYPE FILMS AND OPTICAL FILM USING THE SAME

(75) Inventor: Yasumaro Toshima, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 0 days.

(21) Appl. No.: 12/224,723

(22) PCT Filed: Mar. 6, 2007

(86) PCT No.: PCT/JP2007/054307

§ 371 (c)(1), (2), (4) Date: Sep. 4, 2008

(87) PCT Pub. No.: WO2007/108314

PCT Pub. Date: Sep. 27, 2007

(65) Prior Publication Data

US 2009/0068484 A1    Mar. 12, 2009

(30) Foreign Application Priority Data

Mar. 17, 2006    (JP) .............................. 2006-073777

(51) Int. Cl.
*B32B 27/08* (2006.01)
*B32B 27/18* (2006.01)
*B32B 27/26* (2006.01)
*B32B 27/30* (2006.01)
*B32B 27/36* (2006.01)

(52) U.S. Cl. ................. 428/423.7; 428/423.1; 428/480; 428/483; 525/123; 525/124; 525/131; 525/165; 525/176; 525/190

(58) Field of Classification Search ....................... None
See application file for complete search history.

(56) References Cited

U.S. PATENT DOCUMENTS

| | | | | |
|---|---|---|---|---|
| 3,997,701 A | * | 12/1976 | Ealding et al. ............... | 428/341 |
| 4,314,922 A | * | 2/1982 | Lehner et al. ................ | 524/537 |
| 4,339,566 A | * | 7/1982 | Rosenkranz et al. ........... | 427/66 |
| 4,507,458 A | * | 3/1985 | Shiraki et al. ................. | 528/49 |
| 4,526,920 A | * | 7/1985 | Sakashita et al. .............. | 522/78 |
| 4,642,263 A | * | 2/1987 | Culbertson ................... | 428/336 |
| 4,734,480 A | * | 3/1988 | Kotera et al. .................. | 528/49 |
| 4,808,471 A | * | 2/1989 | Grunzinger ................. | 428/325 |
| 4,892,906 A | * | 1/1990 | Pham et al. ................... | 524/730 |
| 5,096,784 A | * | 3/1992 | Culbertson et al. ........... | 428/482 |
| 5,146,531 A | * | 9/1992 | Shustack ..................... | 385/128 |
| 5,194,327 A | * | 3/1993 | Takahashi et al. ............. | 428/327 |
| 5,260,351 A | * | 11/1993 | Logothetis ................... | 522/152 |
| 5,312,868 A | * | 5/1994 | Abe et al. ..................... | 525/124 |
| 5,379,180 A | * | 1/1995 | Kinoshita ..................... | 361/323 |
| 5,805,358 A | * | 9/1998 | Yamashita et al. ........... | 359/742 |
| 5,852,514 A | * | 12/1998 | Toshima et al. .............. | 359/599 |
| 5,985,437 A | * | 11/1999 | Chappell et al. ............. | 428/336 |
| 5,998,013 A | * | 12/1999 | Shoshi et al. ................ | 428/331 |
| 6,075,094 A | * | 6/2000 | Amekawa ..................... | 525/305 |
| 6,413,629 B1 | * | 7/2002 | Kimura ....................... | 428/343 |
| 6,589,649 B2 | * | 7/2003 | Oya et al. ..................... | 428/343 |
| 6,592,950 B1 | * | 7/2003 | Toshima et al. ............... | 428/1.1 |
| 6,818,276 B2 | * | 11/2004 | Bourdelais et al. ........... | 428/141 |
| 6,822,038 B1 | * | 11/2004 | Gross et al. .................. | 524/507 |
| 6,825,243 B2 | * | 11/2004 | Ohno et al. .................... | 522/97 |
| 6,869,675 B2 | * | 3/2005 | Nair et al. ..................... | 428/327 |
| 6,884,845 B2 | * | 4/2005 | Swarup et al. ............... | 525/131 |
| 7,156,547 B2 | * | 1/2007 | Toshima et al. .............. | 362/618 |
| 7,264,866 B2 | * | 9/2007 | Hashimoto et al. ........... | 428/212 |
| 7,279,525 B2 | * | 10/2007 | Staunton et al. .............. | 525/123 |
| 7,531,238 B2 | * | 5/2009 | Mizuno et al. ............ | 428/423.5 |
| 7,534,487 B2 | * | 5/2009 | Klein et al. .................. | 428/328 |
| 2003/0027917 A1 | * | 2/2003 | Namiki et al. ............... | 524/492 |
| 2003/0050390 A1 | * | 3/2003 | Weikard et al. .............. | 524/589 |
| 2006/0106159 A1 | * | 5/2006 | Ogawa et al. ................ | 524/589 |

FOREIGN PATENT DOCUMENTS

| | | | |
|---|---|---|---|
| JP | 10-045667 | | 2/1998 |
| JP | 2000-119362 | * | 4/2000 |
| JP | 2001-213985 | | 8/2001 |
| JP | 2001-220535 | | 8/2001 |
| JP | 2002-363486 | | 12/2002 |
| JP | 2003-041205 | | 2/2003 |
| JP | 2006-309206 | * | 11/2006 |

* cited by examiner

*Primary Examiner*—Vivian Chen
(74) *Attorney, Agent, or Firm*—Bacon & Thomas, PLLC

(57) ABSTRACT

A binder composition for polyester type films showing superior transparency, film hardness and solvent resistance as well as superior adhesion to polyester type films and an optical film using the composition are provided. The binder composition for polyester type films of the present invention contains a high-molecular weight polymethyl methacrylate (a), an acrylic polyol (b), an isocyanate type curing agent (c), and a polyester resin (d). The optical film of the present invention is an optical film including a polyester type film and a functional layer provided on the polyester type film, the functional layer containing a high-molecular weight polymethyl methacrylate (a), an acrylic polyol (b), an isocyanate type curing agent (c), and a polyester resin (d).

3 Claims, No Drawings

BINDER COMPOSITION APPLIED FOR POLYESTER TYPE FILMS AND OPTICAL FILM USING THE SAME

TECHNICAL FIELD

The present invention relates to a binder composition applied for polyester type films, more precisely, a binder composition applied for polyester type films showing superior transparency, film properties (film hardness) and solvent resistance, as well as superior adhesion to polyester type films, and an optical film using the same.

BACKGROUND ART

In recent years, as various optical films such as light diffusing films, light reflecting films and polarizing films, those comprising a base film and a functional layer such as a light diffusing layer, a mat layer, a backcoat layer and an antistatic layer provided on the base film are used. As the base film, polyester type films showing superior dimensional stability and mechanical strength are frequently used.

As a binder composition constituting such a functional layer, high-molecular weight resins showing superior film hardness and solvent resistance are used, and in particular, those consisting of high-molecular weight acrylic resins which show superior transparency and therefore do not degrade the function as optical film are used (refer to Patent document 1).

Patent document 1: Japanese Patent Unexamined Publication (KOKAI) No. 2003-41205 (claims)

DISCLOSURE OF THE INVENTION

Object to be Achieved by the Invention

Although such high-molecular weight binder compositions in fact show superior transparency, film hardness and solvent resistance, they have a problem of bad adhesion to base materials consisting of polyester type films.

Although adhesion to polyester type films can be improved by adding a resin showing good adhesion to polyester type films, it invites another problem of degrading inherent performances of high-molecular weight acrylic resins such as film hardness and solvent resistance.

Therefore, there has been desired a binder composition which can simultaneously solve the aforementioned problems, that is, shows superior transparency, film hardness and solvent resistance as well as superior adhesion to polyester type films.

Means for Achieving the Object

The inventors of the present invention conducted various researches in order to achieve the aforementioned object, and as a result, found that these problems could be simultaneously solved by using two or more specific resins as a binder composition.

Specifically, it was found that if a binder composition was constituted with a high-molecular weight polymethyl methacrylate (a), an acrylic polyol (b), an isocyanate type curing agent (c), and a polyester resin (d), superior transparency, film hardness and solvent resistance could be attained by the high-molecular weight polymethyl methacrylate (a), and the binder composition could be made to have superior adhesion to polyester type films by inclusion of the acrylic polyol (b), the isocyanate type curing agent (c), and the polyester resin (d) without degrading film hardness and solvent resistance inherently possessed by the high-molecular weight polymethyl methacrylate (a).

The binder composition applied for polyester type films of the present invention is based on the aforementioned finding, and the binder composition applied for polyester type films is characterized by comprising a high-molecular weight polymethyl methacrylate (a), an acrylic polyol (b), an isocyanate type curing agent (c), and a polyester resin (d).

In the binder composition applied for polyester type films of the present invention, the high-molecular weight polymethyl methacrylate (a) preferably has a weight average molecular weight of 100,000 to 600,000.

In the binder composition applied for polyester type films of the present invention, contents of the acrylic polyol (b) and the polyester resin (d) in the composition are preferably 20 to 80 parts by weight and 2 to 30 parts by weight, respectively, with respect to 100 parts by weight of the high-molecular weight polymethyl methacrylate (a).

The aforementioned contents of the components in the binder composition are those not containing solvent in which resin solid content accounts for 100% by weight.

The optical film of the present invention comprises a polyester type film and a functional layer containing the binder composition applied for polyester type films of the present invention and provided on at least one surface of the polyester type film.

In the optical film of the present invention, the functional layer preferably consists of one or more of layers selected from a light diffusing layer, a scattering layer, a reflecting layer, an antireflection layer, an anti-Newton-ring layer, an anti-blocking layer, an antistatic layer and a conductive layer.

Effect of the Invention

A marked effect that has never been achieved so far can be obtained by the present invention, that is, by constituting a binder composition with a high-molecular weight polymethyl methacrylate (a), an acrylic polyol (b), an isocyanate type curing agent (c), and a polyester resin (d), superior transparency, film hardness and solvent resistance can be provided by the high-molecular weight polymethyl methacrylate (a), and adhesion of the binder composition to polyester type films can be increased by the acrylic polyol (b), the isocyanate type curing agent (c), and the polyester resin (d) without degrading performances inherently possessed by the high-molecular weight polymethyl methacrylate (a) such as superior film hardness and solvent resistance.

Moreover, according to the present invention, by using the aforementioned binder composition as a binder composition for a functional layer in an optical film formed by providing the functional layer on a polyester type film, an optical film showing good adhesion between the polyester type film and the functional layer, thus no delamination of both, as well as superior transparency and film hardness can be provided.

Best Mode for Carrying out the Invention

Hereafter, embodiments of the binder composition applied for polyester type films of the present invention will be explained.

The high-molecular weight polymethyl methacrylate (a) which constitutes the binder composition for polyester type films of the present invention refers to polymethyl methacrylate having a weight average molecular weight of 50,000 or larger as determined by GPC, and it is preferably polymethyl methacrylate having a weight average molecular weight of 100,000 to 600,000. By using polymethyl methacrylate having such a high weight average molecular weight, scratch resistance can be imparted to a coated film formed from the composition, and thus the binder composition can be made to have an ability to impart superior film hardness and solvent resistance.

If only the high-molecular weight polymethyl methacrylate (a) is used as binder composition for polyester type films, a binder composition showing superior transparency, film hardness and solvent resistance can surely be obtained. However, such a composition shows poor adhesion to polyester type films. On the other hand, if the acrylic polyol (b), the isocyanate type curing agent (c), and the polyester resin (d) are also contained together, a binder composition showing superior adhesion to polyester type films can be obtained without degrading film hardness and solvent resistance provided by the high-molecular weight polymethyl methacrylate (a).

The high-molecular weight polymethyl methacrylate (a) may be modified with monomers having a radically polymerizable unsaturated double bond, of which typical example is styrene, to such an extent that the effect of the present invention should not be degraded.

The acrylic polyol (b) is an acrylic polyol showing good compatibility with the high-molecular weight polymethyl methacrylate (a), and causes a crosslinking curing reaction with the isocyanate type curing agent (c), which will be explained later. As a result, film hardness and solvent resistance of the binder composition can be improved without decreasing strength of coated film. Moreover, since it does not degrade transparency, a binder composition showing superior transparency can be obtained.

The acrylic polyol (b) may also be modified with monomers having a radically polymerizable unsaturated double bond, of which typical example is styrene, to such an extent that the effect of the present invention should not be degraded, like the high-molecular weight polymethyl methacrylate (a).

Content of the acrylic polyol (b) in the binder composition for polyester type films of the present invention is preferably 20 to 80 parts by weight, more preferably 40 to 70 parts by weight, with respect to 100 parts by weight of the high-molecular weight polymethyl methacrylate (a). With a content of 20 parts by weight or more, good compatibility with the high-molecular weight polymethyl methacrylate (a) can be obtained, and adhesion to polyester type films can be improved. With a content of 80 parts by weight or less, degradation of the performance inherently possessed by the high-molecular weight polymethyl methacrylate (a), such as superior film hardness and solvent resistance, can be prevented.

The isocyanate type curing agent (c) plays a role of a curing agent for crosslinking the acrylic polyol (b) and the polyester resin (d), which will be explained later, to cause curing, and is required to show appropriate reactivity and have NCO group. This component also contributes to impartation of superior adhesion with polyester type films.

Content of the isocyanate type curing agent (c) in the binder composition for polyester type films of the present invention is preferably in such a range that molar ratio of hydroxyl groups of the acrylic polyol (b) and the polyester resin (d) and the NCO groups of the isocyanate type curing agent (c) should be in the range of 2:3 to 3:2. With a content within such a range, the acrylic polyol (b) and the polyester resin (d), and the isocyanate type curing agent (c) can be appropriately chemically bonded.

The polyester resin (d) is used in order to improve adhesion to polyester type films. Moreover, it can crosslink with the isocyanate type curing agent (c) to cause curing, and thereby improve film hardness and solvent resistance of the binder composition without reducing strength of coated film. The polyester resin means a polycondensation product of polyvalent carboxylic acid and polyhydric alcohol. Examples of the polyvalent carboxylic acid include terephthalic acid, isophthalic acid, adipic acid, and so forth, and examples of the polyhydric alcohol include ethylene glycol, propanediol, neopentylglycol, and so forth. A polyester resin having a weight average molecular weight of about 15,000 to 20,000 is preferably used.

Content of the polyester resin (d) in the binder composition for polyester type films of the present invention is preferably 2 to 30 parts by weight, more preferably 5 to 15 parts by weight, with respect to 100 parts by weight of the high-molecular weight polymethyl methacrylate (a). With a content of 2 parts by weight or more, adhesion to polyester type films can be improved. With a content of 30 parts by weight or less, decrease of transparency can be prevented, and the performance inherently possessed by the high-molecular weight polymethyl methacrylate (a), such as superior film hardness and solvent resistance, can be sufficiently exerted.

The binder composition may also contain conventionally known resins, for example, thermoplastic resins, thermosetting resin and ionizing radiation curable resins such as saturated polyesters, polyvinyl chloride-vinyl acetate copolymers, vinyl chloride-vinylidene chloride copolymers, polyvinylpyrrolidones, polyvinyl alcohols, nitrocelluloses, other cellulose derivatives, polyamide polyester type resins, acrylic type resins other than the high-molecular weight polymethyl methacrylate (a) and the acrylic polyol (b) of the present invention, acrylic urethane type resins, polyester acrylate type resins, polyurethane acrylate type resins, epoxy acrylate type resins, urethane type resins, epoxy type resins, polycarbonate type resins, melamine type resins, phenol type resins and silicone type resins, to such an extent that the effect of the binder composition for polyester type films of the present invention should not be degraded.

Total content of the high-molecular weight polymethyl methacrylate (a), the acrylic polyol (b), the isocyanate type curing agent (c) and the polyester resin (d) in the binder composition for polyester type films of the present invention is preferably 50% by weight or more, more preferably 70% by weight or more, still more preferably 90% by weight or more, of the total weight of the binder composition, in view of fully obtaining the effect of the present invention.

The binder composition for polyester type films of the present invention can be obtained by mixing the components mentioned above optionally with a dilution solvent before use. In this mixing process, the hydroxyl groups of the acrylic polyol (b) and the polyester resin (d) chemically bond to NCO groups of the isocyanate type curing agent (c), and thereby properties of the composition such as suitable film hardness can be obtained.

The binder composition for polyester type films of the present invention obtainable as described above can be suitably used as a member or component of various optical films requiring performances of transparency, superior film hardness, solvent resistance and so forth, such as light diffusing films, reflecting films and polarizing films.

Embodiments of the optical film using the binder composition for polyester type films of the present invention will be explained below.

The optical film of the present invention is prepared by providing a functional layer containing the binder composition for polyester type films of the present invention on at least one surface of a polyester type film. The polyester type film serves as a base material, and examples include polyethylene terephthalate films, polyethylene naphthalate films, polybutylene terephthalate films, and so forth. The polyester type film may be subjected to a conventionally known matting treatment such as sandblasting and chemical matting.

For example, polyimide films, polyacrylic films, polystyrene films and so forth are also known as base materials of optical films. However, polyester type films have transparency not inhibiting functions of various optical films, and they are also advantageous in view of dimensional stability and mechanical strength.

Although thickness of the polyester type film is suitably determined depending on use, it is usually preferably about 25 to 350 μm.

Examples of the functional layer include, for example, light diffusing layer, scattering layer, reflecting layer, antireflection layer, anti-Newton-ring layer, anti-blocking layer, antistatic layer, conductive layer, and so forth. Optical films prepared by providing such functional layers on a polyester type film are used as various optical films such as light diffusing films, light scattering films, reflecting films, polarizing films, antireflection films, diffraction films, phase difference films, anti-Newton-ring films, electromagnetic wave shielding films and prism sheets. The functional layer may also be prepared on both surfaces of the polyester type film depending on use, and in such a case, functional layers having different functions may be provided.

The functional layer may contain various pigments, conductive materials and other substances in the binder depending on the function thereof. For example, in the case of light diffusing layer, scattering layer, anti-Newton-ring layer and anti-blocking layer, various pigments including organic pigments and inorganic pigments and resin beads are contained.

Examples of the organic pigments include acrylic resin particles, polystyrene resin particles, polyurethane resin particles, polyethylene resin particles, benzoguanamine resin particles, epoxy resin particles, and so forth. Examples of the inorganic pigments include calcium carbonate, magnesium carbonate, barium sulfate, silica, aluminum hydroxide, kaolin, clay, talc, and so forth. Especially when transparency is required as an optical film, organic pigments showing superior transparency are preferably used.

Type and size of these pigments are suitably chosen depending on characteristics required for the functional layer. Content of these various pigments in the functional layer can also be suitably determined depending on use. In a light diffusing layer, for example, pigments or resin beads are used in an amount of 100 to 300 parts by weight with respect to 100 parts by weight of the binder components, although it may change depending on type and size of the resin. In an anti-Newton-ring layer or anti-blocking layer, pigments or resin beads are used in an amount of 0.1 to 3 parts by weight with respect to 100 parts by weight of the binder components, although it may change depending on type and size of the resin.

A reflecting layer may contain reflective pigments such as aluminum paste, barium sulfate and titanium oxide, an antistatic layer may contain inorganic substances such as AS agent, metal powder, carbon powder and graphite, and a conductive layer may contain conductive materials such as carbon, ITO and ATO. Antireflection layer generally consists of a laminate of a low refraction antireflection layer and a high refraction antireflection layer, the former may contain a pigment having a low refractive index, hollow microparticles of silicon dioxide or the like, or metal oxides, and the latter may contain a metal oxide having a high refractive index.

The functional layer may further contain other resins, crosslinking agents, tackifiers, acid proliferation agents, dilution solvents, fillers, colorants, matting agents, lubricants, antistatic agents, flame retardants, antibacterial agents, antifungal agents, ultraviolet absorbers, light stabilizers, antioxidants, plasticizers, leveling agents, pigment dispersing agents, flow regulators, antifoams, and so forth, as required.

Although thickness of the functional layer is suitably determined depending on use, it is usually in the range of 0.5 to 50 μm.

The optical film of the present invention can be obtained by dissolving materials constituting the functional layer including the aforementioned binder composition for polyester type films in an appropriate solvent to prepare a coating solution for functional layers, applying this coating solution on a polyester type film by a conventionally known method such as bar coating, blade coating, spin coating, roll coating, gravure coating, curtain flow coating, spray coating and screen printing, and drying the coating solution.

On the surface of the polyester type film on which the functional layer is prepared and/or the opposite surface, various optically functional layers such as light diffusing layers, scattering layers, reflecting layers, antireflection layers, anti-Newton-ring layers, anti-blocking layers, antistatic layers and conductive layers, various optical films such as light diffusing films, light scattering films, reflecting films, polarizing films, antireflection films, diffraction films, phase difference films, anti-Newton-ring films, electromagnetic wave shielding films and prism sheets, protective films such as hard coat films, and so forth may be provided without any problem.

EXAMPLES

Hereafter, the present invention will be further explained with reference to examples. The term "part" and the symbol "%" are used on weight basis, unless specifically indicated.

1. Preparation of Laminates

Examples 1 to 5 and Comparative Examples 1 to 4

On one surface of polyester films having a thickness of 100 μm (Lumirror T60, Toray Industries, Inc.) as a base film, binder compositions a to i for polyester type films having the following compositions were each applied by roll coating, and dried at 100° C. for 2 minutes to form resin layers A to I having a thickness of 3 μm, respectively, and thereby obtain laminates of examples and comparative examples.

Contents (parts) of the high-molecular weight polymethyl methacrylate (a) and so forth of the binder compositions a to i for polyester type films of the examples and the comparative examples are shown in Table 1 mentioned below. Contents (parts) of the acrylic polyol (b), the isocyanate type curing agent (c) and the polyester resin (d) in the materials constituting the resin layers A to I of the examples and the comparative examples are shown in Table 2 in terms of weight parts with respect to 100 parts by weight of the high-molecular weight polymethyl methacrylate (a) or low-molecular weight polymethyl methacrylate (a)'. Since the resin layer G did not contain the high-molecular weight polymethyl methacrylate (a) and low-molecular weight polymethyl methacrylate (a)', contents were not mentioned.

Binder Compositions A to I for Polyester Type Films of Examples 1 to 5 and Comparative Examples 1 to 4

High-molecular weight polymethyl methacrylate (a) (molecular weight: 300,000 to 550,000, solid content: 10%) Parts mentioned in Table 1

Low-molecular weight polymethyl methacrylate (a)' (ACRYDIC A-195, Dainippon Ink & Chemicals, Inc., molecular weight: 20,000 to 30,000, solid content: 40%) Parts mentioned in Table 1

Acrylic polyol (b) (ACRYDIC A-807, Dainippon Ink & Chemicals, Inc., solid content: 50%) Parts mentioned in Table 1

Isocyanate type curing agent (c) (Takenate D110N, Mitsui Chemicals Polyurethane, Inc., solid content: 60%) Parts mentioned in Table 1

Polyester resin (d) (Vylon 200, Toyobo Co., Ltd., solid content: 10%) Parts mentioned in Table 1

Dilution solvent 300 parts

TABLE 1

| | | Materials (parts) | | | | |
|---|---|---|---|---|---|---|
| | | High-molecular weight PMMA (a) | Low-molecular weight PMMA (a)' | Acrylic polyol (b) | Isocyanate type curing agent (c) | Polyester resin (d) |
| Example 1 | Composition a | 540.0 | — | 60.0 | 16.7 | 60.0 |
| Example 2 | Composition b | 596.9 | — | 53.1 | 11.9 | 66.3 |
| Example 3 | Composition c | 700.0 | — | 35.6 | 7.4 | 77.8 |
| Example 4 | Composition d | 459.2 | — | 77.6 | 17.0 | 51.0 |
| Example 5 | Composition e | 508.2 | — | 47.1 | 9.8 | 197.6 |
| Comparative Example 1 | Composition f | 500.0 | — | — | — | — |
| Comparative Example 2 | Composition g | — | — | 160.0 | 33.3 | — |
| Comparative Example 3 | Composition h | 574.5 | — | 66.0 | 16.0 | — |
| Comparative Example 4 | Composition i | — | 135.0 | 60.0 | 16.7 | 60.0 |

Composition: binder composition applied for polyester type films
PMMA: polymethyl methacrylate

TABLE 2

| | | Materials (parts) | | | | |
|---|---|---|---|---|---|---|
| | | High-molecular weight PMMA (a) | Low-molecular weight PMMA (a)' | Acrylic polyol (b) | Isocyanate type curing agent (c) | Polyester resin (d) |
| Example 1 | Resin layer A | 100.0 | — | 55.5 | 18.5 | 11.1 |
| Example 2 | Resin layer B | 100.0 | — | 44.4 | 12.0 | 11.1 |
| Example 3 | Resin layer C | 100.0 | — | 25.4 | 6.3 | 11.1 |
| Example 4 | Resin layer D | 100.0 | — | 84.4 | 22.2 | 11.1 |
| Example 5 | Resin layer E | 100.0 | — | 46.3 | 11.6 | 38.9 |
| Comparative Example 1 | Resin layer F | 100.0 | — | — | — | — |
| Comparative Example 2 | Resin layer G | — | — | — | — | — |
| Comparative Example 3 | Resin layer H | 100.0 | — | 57.4 | 16.7 | — |
| Comparative Example 4 | Resin layer I | — | 100.0 | 55.5 | 18.5 | 11.1 |

PMMA: polymethyl methacrylate

2. Evaluation

The laminates obtained in the examples and the comparative examples were evaluated as follows. The results of the evaluation are shown in Table 3.

(1) Transparency

Total light transmission of the laminates obtained in the examples and the comparative examples was measured according to JIS K7361-1:1997 by using a turbidimeter (NDH2000, Nippon Denshoku Industries Co., Ltd.). Total light transmission was measured by irradiating the laminates with light from the resin layer side.

(2) Hardness of Coated Film

Scratching test was performed for the laminates obtained in the examples and the comparative examples according to the pencil scratch test machine method defined in JIS-K5600-5-4:1990. The measured values were symbolized with "○" when they were H or higher, with "Δ" when they were F, and with "X" when they were HB or lower.

(3) Solvent Resistance

The surfaces of the resin layers of the laminates obtained in the examples and the comparative examples were reciprocally rubbed 10 times with cotton waste soaked with methyl ethyl ketone, and the conditions of the resin layers after the rubbing was observed. The result of no change of the resin layer is indicated with the symbol "○", the result of slight whitening due to erosion of only the surface is indicated with the symbol "Δ", and the result of delamination of the resin layer due to erosion of the whole resin layer is indicated with the symbol "X".

(4) Adhesion

The surfaces of the resin layers of the laminates obtained in the examples and the comparative examples were cut so that 100 grids should be formed with 1 mm-gaps between them, cellophane adhesive tape was stuck on cut parts of the surfaces and removed, and then the conditions of the coated films were observed by visual inspection according to the cross cut and tape peeling test defined in JIS-K 5400:1990. The result of no delamination for the grids is indicated with the symbol "○", and the result of delamination for all or a part of the grids is indicated with the symbol "X".

TABLE 3

| | Transparency (%) | Hardness of coated film | Solvent resistance | Adhesion |
|---|---|---|---|---|
| Example 1 | 89.1 | ○ | ○ | ○ |
| Example 2 | 89.2 | ○ | ○ | ○ |
| Example 3 | 89.3 | ○ | ○ | ○ |
| Example 4 | 89.1 | Δ | Δ | ○ |
| Example 5 | 89.4 | Δ | Δ | ○ |
| Comparative Example 1 | 89.3 | ○ | ○ | X |
| Comparative Example 2 | 88.9 | X | X | ○ |
| Comparative Example 3 | 89.1 | ○ | ○ | X |
| Comparative Example 4 | 89.1 | Δ | X | ○ |

As clearly seen from the results shown in Table 3, the laminates of the examples showed high transparency and good hardness of coated film, solvent resistance and adhesion, since the resin layers thereof were constituted with binder compositions for polyester type films containing a high-molecular weight polymethyl methacrylate (a), an acrylic polyol (b), an isocyanate type curing agent (c) and a polyester resin (d).

In particular, the laminates of Examples 1 to 3 showed especially superior hardness of coated film, solvent resistance and adhesion, since the resin layers thereof contained 20 to 80 parts by weight of the acrylic polyol (b) and 2 to 30 parts by weight of the polyester resin (d) with respect to 100 parts by weight of the high-molecular weight polymethyl methacrylate (a).

On the other hand, in the laminate of Comparative Example 1, the whole resin layer was delaminated during the evaluation of adhesion, and thus it showed extremely poor adhesion to polyester films, although it showed superior transparency, film hardness and solvent resistance, since it utilized the high-molecular weight polymethyl methacrylate (a) alone as a binder composition for polyester type films.

The laminate of Comparative Example 2 utilized the acrylic polyol (b) and the isocyanate type curing agent (c) as a binder composition for polyester type films, but it did not contain the high-molecular weight polymethyl methacrylate (a). Therefore, it showed poor film hardness and solvent resistance, although it showed superior adhesion to polyester type films.

The laminate of Comparative Example 3 utilized the high-molecular weight polymethyl methacrylate (a), the acrylic polyol (b) and the isocyanate type curing agent (c) as a binder composition for polyester type films, but it did not contain the polyester resin (d). Therefore, it showed poor adhesion to polyester type films, although it showed superior film hardness and solvent resistance.

The laminate of Comparative Example 4 showed poor solvent resistance, since it utilized the low-molecular weight polymethyl methacrylate (a)', not the high-molecular weight polymethyl methacrylate (a).

Then, optical films (light diffusing films) of Examples 1 to 5 were prepared in the same manner as that of the preparation of laminates mentioned above except that parts by weight of polymethyl methacrylate particles (TecPolymer MBX-8, Sekisui Plastics Co., Ltd.) were added to the binder compositions a to e of Examples 1 to 5, and a functional layer having a thickness of 12 μm (light diffusing layer) was formed. These optical films were evaluated as described above, and all showed favorable transparency, film hardness, solvent resistance and adhesion to polyester films. Moreover, the functional layers favorably showed the function thereof (light diffusing property) without any problems.

The invention claimed is:

1. A binder composition for polyester type films, comprising a polymethyl methacrylate having a weight average molecular weight of 100,000 to 600,000 (a), an acrylic polyol (b), an isocyanate curing agent (c), and a polyester resin (d), contents of the acrylic polyol (b) and the polyester resin (d) in the composition are 20 to 80 parts by weight and 2 to 30 parts by weight, respectively, with respect to 100 parts by weight of the polymethyl methacrylate (a).

2. An optical film comprising a polyester type film and a functional layer provided on at least one surface of the polyester type film, wherein the functional layer contains the binder composition according to claim 1.

3. The optical film according to claim 2, wherein the functional layer consists of one or more layers selected from a light diffusing layer, a scattering layer, a reflecting layer, an antireflection layer, an anti-Newton-ring layer, an anti-blocking layer, an antistatic layer and a conductive layer.

* * * * *